(12) United States Patent
Sommansson et al.

(10) Patent No.: US 12,728,858 B2
(45) Date of Patent: Sep. 8, 2026

(54) SYSTEM FOR BRAKING AN ELECTRIFIED VEHICLE

(71) Applicant: Scania CV AB, Södertälje (SE)

(72) Inventors: Joakim Sommansson, Grödinge (SE); Erik Höckerdal, Södertälje (SE); Jens Gustavsson, Åkers Styckebruk (SE); Anders Larsson, Tullinge (SE); Oskar Leufven, Södertälje (SE); Christer Roos, Rönninge (SE); Daniel Johnsson, Skyttorp (SE)

(73) Assignee: Scania CV AB, Södertälje (SE)

( * ) Notice: Subject to any disclaimer, the term of this patent is extended or adjusted under 35 U.S.C. 154(b) by 314 days.

(21) Appl. No.: 18/567,455

(22) PCT Filed: Jun. 2, 2022

(86) PCT No.: PCT/SE2022/050529
§ 371 (c)(1),
(2) Date: Dec. 6, 2023

(87) PCT Pub. No.: WO2022/265557
PCT Pub. Date: Dec. 22, 2022

(65) Prior Publication Data

US 2024/0217516 A1 Jul. 4, 2024

(30) Foreign Application Priority Data

Jun. 17, 2021 (SE) .................................. 2150777-7

(51) Int. Cl.
*B60W 30/18* (2012.01)
*B60K 17/08* (2006.01)
(Continued)

(52) U.S. Cl.
CPC ....... *B60W 30/18109* (2013.01); *B60K 17/08* (2013.01); *B60L 7/08* (2013.01);
(Continued)

(58) Field of Classification Search
CPC ............... B60W 10/196; B60W 10/30; B60W 30/18109; B60W 30/1886; B60L 7/08; B60L 7/22
See application file for complete search history.

(56) References Cited

U.S. PATENT DOCUMENTS 8,008,877 B2 * 8/2011 Fushiki .................... B60K 6/46 318/472
8,327,623 B2 * 12/2012 Raman .................... B60K 6/46 60/303
(Continued)

FOREIGN PATENT DOCUMENTS

CN 102834283 A 12/2012
CN 103155378 A 6/2013
(Continued)

OTHER PUBLICATIONS

Scania CV AB, International Patent Application No. PCT/SE2022/050529, International Search Report, Jun. 17, 2022.
(Continued)

*Primary Examiner* — Jeffrey J Restifo
(74) *Attorney, Agent, or Firm* — Moore & Van Allen PLLC; W. Kevin Ransom

(57) ABSTRACT

A system for braking a vehicle is provided. The system comprises a powertrain comprising an electric machine arranged to propel the vehicle and a transmission arranged to transfer power between the electric machine and the driving wheels of the vehicle. The system further comprises a resistor device arranged to dissipate electric energy generated by the electric machine during braking of the vehicle, and an airflow generating device arranged to generate an airflow over the resistor device. The airflow generating device is arranged to be mechanically driven by the powertrain so as to generate said airflow. By (mechanically) driving the airflow generating device by means of the
(Continued)

powertrain, the airflow generating device does not need its own motor, thereby making the system less complex. Further, the driving of the airflow generating device by means of the powertrain will consume energy itself, contributing to braking the vehicle.

12 Claims, 2 Drawing Sheets

(51) Int. Cl.

| | |
|---|---|
| ***B60L 7/08*** | (2006.01) |
| ***B60L 15/00*** | (2006.01) |
| ***B60W 10/196*** | (2012.01) |
| ***B60W 10/30*** | (2006.01) |
| ***B60W 30/188*** | (2012.01) |
| *B60L 7/22* | (2006.01) |

(52) U.S. Cl.

CPC ......... *B60L 15/007* (2013.01); *B60W 10/196* (2013.01); *B60W 10/30* (2013.01); *B60W 30/1886* (2013.01); *B60L 7/22* (2013.01)

(56) References Cited

U.S. PATENT DOCUMENTS

| | | | | |
|---|---|---|---|---|
| 8,376,476 | B2 * | 2/2013 | Ikeda | B60L 7/06 303/3 |
| 8,925,661 | B2 * | 1/2015 | Minoshima | B60K 11/00 180/65.1 |
| 10,221,781 | B1 | 3/2019 | Hussain | |
| 11,305,652 | B2 * | 4/2022 | Park | B60L 7/22 |
| 12,049,119 | B2 * | 7/2024 | Park | B60L 1/02 |
| 12,347,590 | B2 * | 7/2025 | Rahm | H01C 1/082 |
| 12,525,842 | B2 * | 1/2026 | Rahm | H02K 5/207 |
| 2002/0190695 | A1 | 12/2002 | Wall et al. | |
| 2006/0086547 | A1 * | 4/2006 | Shimada | B60L 7/22 180/65.265 |
| 2013/0285583 | A1 | 10/2013 | Strothmann | |
| 2023/0290966 | A1 * | 9/2023 | Arya | B60L 1/003 |
| 2023/0364962 | A1 * | 11/2023 | Appel | B60L 7/22 |
| 2024/0217516 | A1 * | 7/2024 | Sommansson | B60L 15/2009 |
| 2025/0001872 | A1 * | 1/2025 | Tennevall | H01C 1/08 |
| 2025/0007429 | A1 * | 1/2025 | Tennevall | B60T 13/586 |
| 2025/0058642 | A1 * | 2/2025 | Tessier, Jr. | B60L 7/22 |
| 2025/0074368 | A1 * | 3/2025 | Arya | B60L 1/003 |
| 2025/0157705 | A1 * | 5/2025 | Gaddam | B60L 7/22 |
| 2025/0157706 | A1 * | 5/2025 | Agee | H01C 13/02 |
| 2025/0381946 | A1 * | 12/2025 | Rahm | B60L 15/2045 |

FOREIGN PATENT DOCUMENTS

| | | | |
|---|---|---|---|
| CN | 110446639 | A | 11/2019 |
| DE | 19615742 | C1 | 5/1997 |
| DE | 102006049194 | A1 | 5/2008 |
| DE | 102010047235 | A1 | 4/2012 |
| EP | 611675 | A1 | 8/1994 |
| EP | 2594426 | A1 | 5/2013 |
| EP | 3569440 | A2 | 11/2019 |
| EP | 3640103 | A1 | 4/2020 |
| EP | 3787183 | A1 | 3/2021 |
| JP | 06046505 | A | 2/1994 |
| JP | 2012039839 | A | 2/2012 |
| RU | 2706865 | C1 | 11/2019 |
| WO | 2020139791 | A1 | 7/2020 |

OTHER PUBLICATIONS

Scania CV AB, International Patent Application No. PCT/SE2022/050529, Written Opinion, Jun. 17, 2022.

Scania CV AB, Swedish Patent Application No. 2150777-7, Office Action, Jan. 28, 2022.

Scania CV AB, European Patent Application No. 22825428.0, Extended European Search Report, Mar. 24, 2025.

Scania CV AB, International Patent Application No. PCT/SE2022/050529, International Preliminary Report on Patentability, Dec. 14, 2023.

Scania CV AB, Chinese Patent Application No. 202280036921.6, First Office Action, Apr. 1, 2026.

* cited by examiner

SYSTEM FOR BRAKING AN ELECTRIFIED VEHICLE

CROSS-REFERENCE TO RELATED APPLICATIONS

This application is a National Stage Patent Application (filed under 35 § U.S.C. 371) of PCT/SE2022/050529, filed Jun. 2, 2022, of the same title, which, in turn claims priority to Swedish Patent Application No. 2150777-7 filed Jun. 17, 2021, of the same title; the contents of each of which are hereby incorporated by reference.

FIELD OF THE INVENTION

The present invention generally relates to the field of electrified vehicles. In particular, the present invention relates to systems for braking such vehicles.

BACKGROUND OF THE INVENTION

Electrified vehicles (xEVs) typically make use of regenerative braking in addition to the ordinary wheel brakes. When regeneratively braking, the electric machine is rotated by the motive force from the wheels and thereby operates as a generator generating electrical energy which is stored in a battery of the vehicle. Hence, the energy being braked away is recovered in the battery, whereby the range of the vehicle in electric mode is extended. A problem with regenerative braking is that when the battery is fully charged, or otherwise unable to receive the required charging power due to e.g. the battery being too hot or too cool, regenerative braking is no longer possible. For heavy vehicles, this may be the case when running in long downhills, in particular in hybrid applications, in which the size of the battery is relatively small. According to current regulations, a heavy vehicle has to be able to brake for 12 min at 225 KW braking power. That corresponds to 45 kWh of energy that needs to be stored in the battery in case only regenerative braking is used. Hence, some kind of auxiliary brake system in addition to the regenerative braking is desirable.

Traditional heavy vehicles use auxiliary brakes in order to reduce wear on the ordinary wheel brakes. Examples of traditional auxiliary brakes are exhaust brake, compression release brake and/or water/oil retarder. These types of auxiliary brakes are often difficult, or even impossible, to implement in electrified vehicles due to the internal combustion engine being too small (in case of hybrid propulsion), or the lack of an internal combustion engine (in case of pure battery propulsion). For example, in a hybrid vehicle, the internal combustion engine is typically smaller than that of a vehicle with pure internal combustion engine propulsion, whereby exhaust brake may not be powerful enough to fulfil braking power requirements. An auxiliary brake in the form of a retarder (operated with water or oil), on the other hand, do not require an internal combustion engine. However, it requires a substantial cooling system, as the water/oil gets very hot during braking. Typically, such cooling system is rather complex and is normally integrated with the engine cooling system (in case the vehicle is equipped with an internal combustion engine). Further, such cooling system requires a heat exchanger in the front of the vehicle which might impair the aerodynamics of the vehicle.

An example of a method of braking an electrified vehicle is disclosed in EP2594426 A1. Here, a resistor is arranged to consume power generated by an electric machine of the vehicle when the vehicle is braking. Cooling air is supplied to the resistor from a blower. The blower is driven by its own motor.

SUMMARY OF THE INVENTION

It would be advantageous to achieve a system overcoming, or at least alleviating, the above mentioned drawbacks. In particular, it would be desirable to enable a system for braking a vehicle when the battery is fully charged without using wheel brakes. It would also be desirable to enable such a system of reduced complexity.

To better address one or more of these concerns, a system for braking a vehicle having the features defined in the independent claim is provided. Preferable embodiments are defined in the dependent claims.

Hence, a system for braking a vehicle is provided. The system comprises a powertrain comprising an electric machine arranged to propel the vehicle and a transmission arranged to transfer power between the electric machine and the driving wheels of the vehicle. The system further comprises a resistor device arranged to dissipate electric energy generated by the electric machine during braking of the vehicle, and an airflow generating device arranged to generate an airflow over the resistor device. The airflow generating device is arranged to be mechanically driven by the powertrain so as to generate said airflow.

Using a resistor device for dissipating electric energy generated during braking reduces the need of further auxiliary braking systems (such as a retarder or an exhaust brake) while still enabling braking the vehicle without using the wheel brakes when the battery is fully charged. By (mechanically) driving the airflow generating device by means of the powertrain, the airflow generating device does not need its own motor, thereby making the braking system less complex. Further, the driving of the airflow generating device by means of the powertrain will consume energy itself, contributing to braking the vehicle.

According to an embodiment, the system may comprise a control arrangement configured to control braking of the vehicle.

According to an embodiment, a braking torque produced by the system may be variable by controlling a power consumed by the airflow generating device. The power consumed by the airflow generating device will be taken from the kinetic energy of the moving vehicle via the powertrain. A higher power consumption of the airflow generating device will create a higher resistance in revolving the powertrain, which results in a higher braking torque. Hence, by controlling the power consumption of the airflow generating device (in one way or another), the braking torque produced by the system may be controllable. The power consumption may e.g. be controllable by the control arrangement of the system.

According to an embodiment, the system may further comprise a gearing with at least two selectable gear ratios, the gearing being arranged to transfer power from the powertrain to the airflow generating device. Thereby, the power consumed by the airflow generating device may be controllable by controlling the gear selection of the gearing. The airflow generating device may thus be driven at at least two different speeds, thereby generating at least two different braking torques. At a lower speed, the airflow generating device may consume less power and the braking torque will consequently be lower. At a higher speed, the airflow generating device may consume more power and the braking torque will consequently be higher.

According to embodiments, the gearing may comprise at least one part that is part of a main gearbox of the powertrain arranged to transfer propulsion power towards the driving wheels at different gear ratios, and/or at least one part that is separate from the main gearbox. Hence, the airflow generating device may either have its own gearing (or gearbox), which optionally may be relatively simple in design, or it may be coupled to the powertrain upstream of the main gearbox (as seen in the direction from the electric machine towards the wheels) so that the motive power from the wheels passes the main gearbox before it reaches the airflow generating device, whereby the main gearbox dictates the speed of the airflow generating device. A combination of these two alternatives may also be envisaged. Hence, the airflow generating device may have its own gearing and, in addition to that, be coupled to the powertrain upstream of the main gearbox. Using the main gearbox as gearing for the airflow generating device is advantageous in that already existing parts of the powertrain are utilized for controlling the braking torque, which in turn reduces the complexity of the system.

According to an embodiment, the airflow generating device may comprise a variable geometry and the power consumed by the airflow generating device may be controllable by controlling the variable geometry, which is advantageous in that it enables a stepless control of the braking torque. The variable geometry may e.g. be controlled to create a higher flow resistance which in turn may increase the power consumption of the air generating device by lowering its efficiency. The variable geometry may e.g. comprise pitchable vanes, inlet guide vanes, a variable width compressor diffuser.

According to embodiments, the system may further comprise at least one of: a throttle positioned at an inlet of the airflow generating device, and a throttle positioned at an outlet of the airflow generating device. By controlling the throttle at the inlet and/or the throttle at the outlet (such as the opening and closing thereof), the power consumption of the airflow generating device can be controlled. A more closed throttle at the inlet will produce a lower flow (which will decrease the pressure of the inlet air) and thereby a lower braking torque, while a more open throttle at the inlet will produce a higher flow (which will increase the pressure of the air) and thereby a higher braking torque. A more closed throttle at the outlet will produce a higher flow resistance (which will increase the pressure of the outlet air) and thereby a higher braking torque, while a more open throttle at the outlet will produce a lower flow resistance (which will lower the pressure of the outlet air) and thereby a lower braking torque. The present embodiments are advantageous in that they enable a relatively simple design for controlling the braking torque.

According to an embodiment, a braking torque produced by the system may be variable by controlling a current through the resistor device. For example, the control arrangement of the system may be configured to control the current through the resistor device. The current through the resistor device may e.g. be controlled by means of a switching device (such as one or more transistors). The present embodiment is advantageous in that enables a relatively simple, and preferably stepless, control of the braking torque.

For example, the braking torque produced by the system may be controllable in large steps by controlling the airflow generating device and finetuned by controlling the current through the resistor.

According to an embodiment, the system may further comprise an inverter arranged to control the electric machine, wherein the inverter may be arranged to control the size of the current through the resistor device. Accordingly, an already existing part of the vehicle may be utilized for controlling the braking torque, which in turn reduces the complexity of the system. For example, the inverter may be part of (or connected to) the control arrangement of the system.

Preferably, the airflow generating device may be selectively driven by the powertrain. That may enable uncoupling the airflow generating device from the powertrain when no braking torque is desired.

According to an embodiment, the system may comprise a clutch device arranged to mechanically and selectively couple the airflow generating device to the powertrain. The clutch device may be of any suitable design, such as a claw clutch, spline coupling or slip clutch. For example, the control arrangement may be configured to control the clutch.

According to an embodiment, the system may further comprise a control arrangement (such as the one previously mentioned) and a battery arranged to power the electric machine. The control arrangement may be configured to, while the vehicle is being propelled by the electric machine, control the system so as to mechanically connect the airflow generating device to the powertrain and to operate the resistor device so as to proactively at least partially deplete the battery before an upcoming braking distance. Hence, the braking system may be operated while the vehicle is being propelled to deplete at least some of the battery if a braking distance is approaching. E.g. the vehicle may comprise a look ahead system which can predict a future braking need, e.g. based on map data, such as if a downhill run is approaching, or other future battery limits such as a risk of the battery becoming too hot or too cold. The battery may then be proactively depleted so as to enable regenerative braking further on in the downhill run and with reduced risk of violating e.g. temperature limits of the battery.

According to an embodiment, the system may further comprise a restriction conduit arranged to restrict the airflow over the resistor device. The restriction conduit may concentrate and thereby accelerate the airflow from the airflow generating device over the resistor device. Accordingly, an enhanced cooling of the resistor device is provided as well as an increased flow resistance for the airflow generating device, which increases the braking torque capacity of the system.

According to an embodiment, a vehicle is provided. The vehicle comprises a system according to any one of the embodiments described herein.

It is noted that embodiments of the invention relates to all possible combinations of features recited in the claims.

BRIEF DESCRIPTION OF THE DRAWINGS

Embodiments of the present invention will now be described in more detail in the following illustrative and non-limiting detailed description, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION OF EMBODIMENTS

Figure 1:
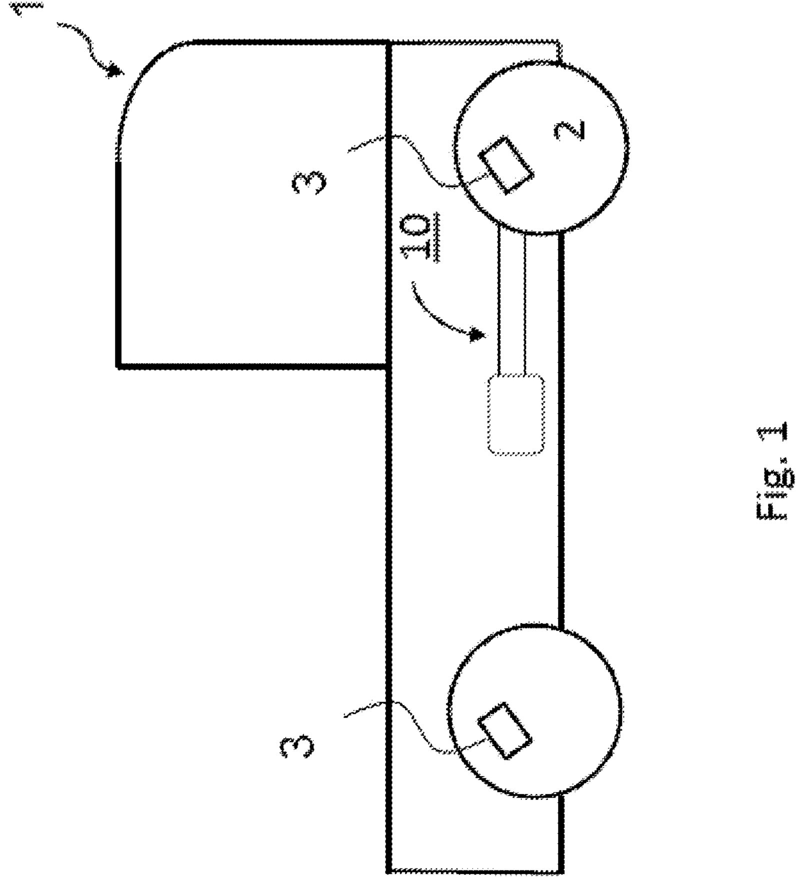
FIG. 1 shows a vehicle according to an embodiment.

FIG. 1 shows a vehicle 1 according to an embodiment. The vehicle 1 may e.g. be a heavy vehicle, such as a truck or a bus. According to further embodiments, the vehicle 1 may be another type of heavy or lighter type of manned or unmanned vehicle for land based propulsion such as a construction vehicle, a tractor, a car, or the like. The vehicle 1 may comprise an electrified powertrain providing torque to the wheels 2. The vehicle 1 may be any suitable xEV, such as any kind of hybrid, fuel cell or battery electric vehicle. The vehicle 1 may comprise traditional wheel brakes 3. In addition to the wheel brakes, the vehicle 1 may comprise a system 10 for braking the vehicle 1.

An example of such a system 10 will now be described in more detail with reference to FIG. 2.

The system 10 includes the powertrain 11 of the vehicle. The powertrain 11 comprises an electric machine 12 for propulsion of the vehicle. In case of a hybrid application, the powertrain 11 may further comprise an internal combustion engine (not shown). Further, a transmission 13 is arranged to transfer power from the electric machine 12 to the driving wheels 2. Optionally, the transmission 13 may comprise gearing, such as a gearbox 16 (which may be referred to as a main gearbox) with at least two selectable gear ratios for providing at least two different speeds. For example, the gearbox 16 may comprise a first pair of gear wheels 15*a* for providing a first gear ratio and a second pair of gear wheels 15*b* for providing a second gear ratio. The powertrain 11 may further comprise any suitable shafts for connecting the different elements thereof.

The electric machine 12 may be powered by a battery 40 and may be controlled by an inverter 35. The inverter 35 serves to control the current to the electric machine 12, thereby regulating the power delivered from the electric machine 12 to the driving wheels 2. The inverter 35 also controls delivery of current back to the battery 40 when the vehicle is regeneratively braking. The inverter 35 may comprise any suitable circuitry 37 (including e.g. transistors and switches) for controlling the electric machine 12.

Figure 2:
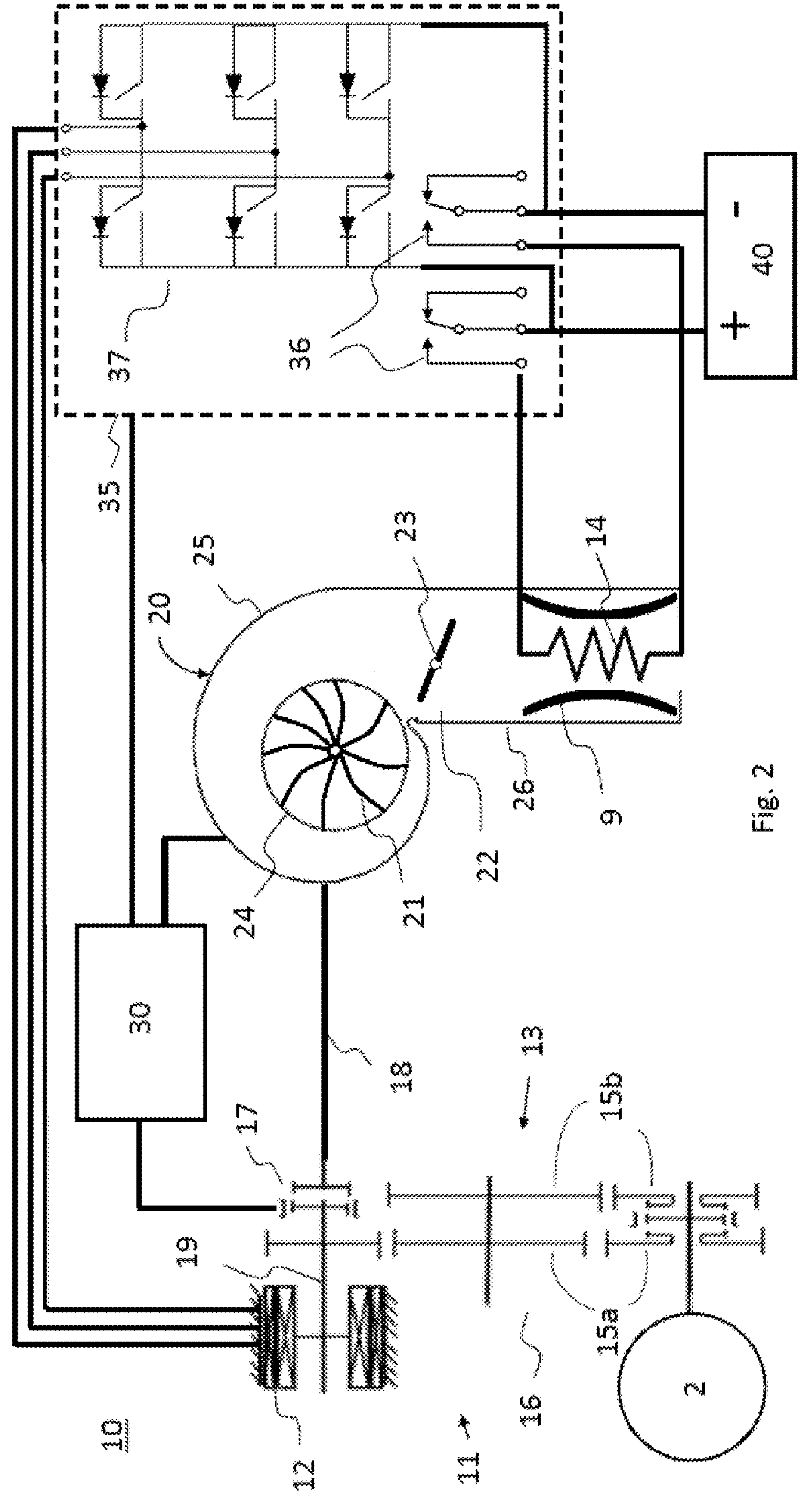
FIG. 2 shows a system for braking a vehicle according to an embodiment.

The system 10 further comprises a resistor device 14, which in its simplest form may be just a resistor (as shown in FIG. 2), but may also comprise further elements, such as several resistors and optionally other suitable circuitry (not shown). The resistor device 14 is arranged to dissipate electric energy generated by the electric machine 12 during braking of the vehicle. For example, the resistor device 14 may be electrically connected to the electric machine 12 and the battery 40 by means of one or more switches 36. For example, the switches 36 may be included in the inverter 35.

The system 10 further comprises an airflow generating device 20 arranged to generate an airflow for cooling the resistor device 14. The airflow generating device 20 may alternatively be referred to as a fan or blower. The airflow generating device 20 may comprise vanes/blades 21 that may be arranged on/coupled to a rotatable shaft 18. For example, the vanes 21 may be pitchable for providing a variable geometry of the airflow generating device 20. Other types of variable geometries of the airflow generating device may also be envisaged, such as inlet guide vanes and/or a variable width compressor diffuser. Optionally, the airflow generating device 20 may further comprise a housing 25 having an inlet 24 (extending inwards in FIG. 2) and an outlet 22. Optionally, a throttle 23 may be arranged at the outlet 22 and/or at the inlet 24 of the airflow generating device 20 (the latter not shown). The airflow generated by the airflow generating device 20 may be lead through a duct 26 to the resistor device 14. For example, the resistor device 14 may be arranged in the duct 26. Further, a restriction conduit 9 may be arranged to restrict, and thereby accelerate, the airflow over the resistor device 20. For example, the restriction conduit 9 may be arranged in/be part of the duct 26.

The airflow generating device 20 is arranged to be mechanically driven by the powertrain 11 so as to generate the airflow over the resistor device 14. For example, a clutch device 17 may be arranged to mechanically and selectively couple the airflow generating device 20 to the powertrain 11. For example, the clutch device 17 may be arranged on/coupled to an output shaft 19 of the electric machine 12. The clutch device 17 may further be arranged on/coupled to the shaft 18 of the airflow generating device 20. The clutch 17 may be of any suitable type, such as a claw clutch, spline coupling or slip clutch. In the present specification, the term "clutch" should be broadly interpreted as any coupling means able to connect and disconnect the airflow generating device to/from the powertrain.

Optionally, the airflow generating device 20 may have its own dedicated gearing (not shown) separate from the main gearbox 16. Such a gearing may e.g. be arranged between the clutch 17 and the airflow generating device 20 so as to enable the airflow generating device 20 to be driven at different speeds.

The system 10 may further comprise a control arrangement 30. In the present disclosure, the term "control arrangement" should be broadly interpreted as any control means, in a single unit or a distributed network of units, carrying software for controlling hardware elements of the system 10. The control arrangement 30 may e.g. be arranged to control one or more of: the clutch 17, the pitchable vanes 21 and the throttle 23, the gearbox 16 and any dedicated gearing of the airflow generating device 20. Further, the control arrangement 30 may be connected to/part of the inverter 35 and/or the switches 36. It will be appreciated that, what is referred to as the control arrangement 30 in the present disclosure may be comprised (or distributed) in traditional electronic control units of the vehicle, such as in a transmission control unit and/or in an inverter control unit.

In the following, an example of operation of the system 10 will be described, still with reference to FIG. 2.

During forward drive of the vehicle, the inverter 35 may be controlled (such as by the control arrangement 30) to provide current to the electric machine 12 from the battery 40. The motive power produced by the electric machine 12 is transferred via the transmission 13 (e.g. including the main gearbox 16) to the driving wheels 2.

When the vehicle is braked, regenerative braking may preferably be prioritized over other types of braking for saving the wheel brakes and for recovering kinetic energy in order to extend the vehicle's reach on electric power. When the vehicle is regeneratively braked, motive force is transferred from the driving wheels 2 to the electric machine 12 by means of the transmission 13. That is, power is transferred in the opposite direction throughout the powertrain 11 as compared to in forward drive of the vehicle. The rotating electric machine 12 now operates as a generator and produce current which is brought back to the battery 40 via the inverter 35. The resistance of rotating the electric machine 12 results in a braking torque braking the vehicle.

In some situations, the battery 40 gets fully charged. This may e.g. be the case in long downhill runs, in particular for heavy vehicles requiring high braking torque and if the battery is relatively small (such as in hybrid applications). In these situations, the resistor device 14 may be connected (such as by switches 36) so as to dissipate the electric energy generated by the electric machine during the braking. Hence, the current generated by the electric machine 12 may be lead through the resistor device 14, which turns the electrical energy into heat. Further, the airflow generating device 20 is mechanically coupled to the powertrain (such as by the clutch 17) so as to generate an airflow over the resistor device 14 for cooling it. Hence, part of the motive force from the driving wheels 2 is transferred to, and consumed by the airflow generating device 20. This contributes to the braking torque braking the vehicle.

It will be envisaged that the resistor device 14 and the airflow generating device 20 may sometimes be operated separately. However, the resistor device 14 may not be operated for too long without cooling from the airflow generating device 20 for avoiding overheating.

Further, it will be appreciated that the resistor device 14 (and preferably also the airflow generating device 20) may be operated while the vehicle is being regeneratively braked. Part of the electrical energy is then stored in the battery and another part is dissipated a heat in the resistor device 14.

The braking torque produced by the system 10 may be regulated in several ways. For example, the braking torque may be regulated by controlling a power consumed by the airflow generating device 20. This may be accomplished by e.g. varying the pitch of the vanes 21 (or varying any other part of a variable geometry of the airflow generating device 20) or by bringing the throttle 23 at the outlet to a more closed position (higher braking torque) or to a more open position (lower braking torque). If a throttle is used being arranged at the inlet of the airflow generating device 20, the braking torque is increased by bringing the throttle to a more open position and decreased by bringing the throttle to a more closed position. Further, different gear ratios of the gearing (such as of the main gearbox 16, and/or of the air flow generating device's own dedicated gearing) may be selected, whereby the airflow generating device 20 may be driven at different speeds. A lower speed will give a lower braking torque and a higher speed will give a higher braking torque.

Further, the braking torque may be variable by controlling the current through the resistor device 14. A higher current through the resistor device 14 gives a higher torque and a lower current gives a lower torque. Preferably, the current through the resistor device 14 may be controlled so as to finetune the braking torque to a fairly exact desired value.

According to an example, the control arrangement 30 may comprise, or have access to, look ahead functionality able to see upcoming braking needs (e.g. based on map data), such as long downhill runs. The control arrangement 30 may then be configured to, while the vehicle is being propelled by the electric machine (i.e. during forward drive), control the system 10 so as to mechanically connect the airflow generating device 20 to the powertrain 11 and to operate the resistor device 14 so as to proactively at least partially deplete the battery 40 before an upcoming braking distance. The vehicle may then later on in the downhill run be regeneratively braked such that energy is restored in the battery 40.

The person skilled in the art realizes that the present invention by no means is limited to the embodiments described above. On the contrary, many modifications and variations are possible within the scope of the appended independent claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A system for braking a vehicle, the system comprising:
- a powertrain comprising an electric machine arranged to propel the vehicle and a transmission arranged to transfer power between the electric machine and driving wheels of the vehicle;
- a resistor device arranged to dissipate electric energy generated by the electric machine during braking of the vehicle; and
- an airflow generating device arranged to generate an airflow over the resistor device, and
- wherein the airflow generating device is arranged to be mechanically driven by the powertrain so as to generate said airflow.

2. The system as defined in claim 1, wherein a braking torque produced by the system is variable by controlling a power consumed by the airflow generating device.

3. The system as defined in claim 2, further comprising a gearing with at least two selectable gear ratios, the gearing being arranged to transfer power from the powertrain to the airflow generating device, wherein the braking torque is variable by controlling the gear selection of the gearing.

4. The system as defined in claim 3, wherein the gearing comprises:
- at least one part that is part of a main gearbox of the powertrain arranged to transfer propulsion power towards the driving wheels at different gear ratios, and/or
- at least one part that is separate from the main gearbox arranged to transfer propulsion power towards the driving wheels at different gear ratios.

5. The system as defined in claim 2, wherein the airflow generating device comprises a variable geometry, and wherein the braking torque is variable by controlling the variable geometry.

6. The system as defined in claim 2, further comprising at least one of:
- a throttle positioned at an inlet of the airflow generating device, wherein the braking torque is variable by controlling the throttle positioned at an inlet, or
- a throttle positioned at an outlet of the airflow generating device, wherein the braking torque is variable by controlling the throttle positioned at an inlet.

7. The system as defined in claim 1, wherein a braking torque produced by the system is variable by controlling a current through the resistor device.

8. The system as defined in claim 7, further comprising an inverter arranged to control the electric machine, wherein the inverter is arranged to control the size of the current through the resistor device.

9. The system as defined in claim 1, further comprising a clutch device arranged to mechanically and selectively couple the airflow generating device to the powertrain.

10. The system as defined in claim 1, further comprising a control arrangement and a battery arranged to power the electric machine, wherein the control arrangement is configured to, while the vehicle is being propelled by the electric machine, control the system so as to mechanically connect the airflow generating device to the powertrain and to operate the resistor device so as to proactively at least partially deplete the battery before an upcoming braking distance.

11. The system as defined in claim 1, further comprising a restriction conduit arranged to restrict the airflow over the resistor device.

12. A vehicle comprising a system, wherein the system comprises:

a powertrain comprising an electric machine arranged to propel the vehicle and a transmission arranged to transfer power between the electric machine and driving wheels of the vehicle;

a resistor device arranged to dissipate electric energy generated by the electric machine during braking of the vehicle; and an airflow generating device arranged to generate an airflow over the resistor device, and wherein the airflow generating device is arranged to be mechanically driven by the powertrain so as to generate said airflow.

* * * * *